(12) United States Patent
Robertson, III

(10) Patent No.: US 9,464,729 B2
(45) Date of Patent: Oct. 11, 2016

(54) PRESSURE BALANCED VALVE

(75) Inventor: Walter Dennis Robertson, III, Harleysville, PA (US)

(73) Assignee: Brooks Instrument, LLC, Hatfield, PA (US)

( * ) Notice: Subject to any disclaimer, the term of this patent is extended or adjusted under 35 U.S.C. 154(b) by 734 days.

(21) Appl. No.: 13/492,509

(22) Filed: Jun. 8, 2012

(65) Prior Publication Data

US 2012/0323379 A1 Dec. 20, 2012

Related U.S. Application Data

(60) Provisional application No. 61/496,916, filed on Jun. 14, 2011.

(51) Int. Cl.
*F16K 31/06* (2006.01)
*G05D 7/06* (2006.01)
*F16K 39/02* (2006.01)

(52) U.S. Cl.
CPC ....... *F16K 31/0655* (2013.01); *F16K 31/0693* (2013.01); *F16K 39/022* (2013.01); *G05D 7/0635* (2013.01)

(58) Field of Classification Search
CPC .......... F16K 31/0655; F16K 31/0693; F16K 39/022; F16K 31/38; F16K 31/043; F16K 31/406; F16K 31/408
USPC ................. 251/129.07, 129.15, 129.16, 282, 251/30.03, 30.04
See application file for complete search history.

(56) References Cited

U.S. PATENT DOCUMENTS

| | | | |
|---|---|---|---|
| 3,010,695 A * | 11/1961 | Banks | 251/205 |
| 6,505,812 B1 | 1/2003 | Anastas | |
| 6,871,802 B2 * | 3/2005 | Stilwell | F16K 1/305 169/19 |
| 7,921,880 B2 * | 4/2011 | Jackson | F15B 11/042 137/881 |
| 8,333,362 B2 * | 12/2012 | Busato | F16K 31/0655 251/129.07 |
| 2006/0273270 A1 * | 12/2006 | Bill | F15B 11/05 251/44 |
| 2008/0116406 A1 * | 5/2008 | Robertson, III et al. | 251/129.08 |
| 2010/0049461 A1 | 2/2010 | Lull | |
| 2010/0252761 A1 * | 10/2010 | Robertson, III | 251/129.15 |
| 2010/0294962 A1 * | 11/2010 | Bill | F16K 31/408 251/30.01 |
| 2011/0114196 A1 | 5/2011 | Lall et al. | |

FOREIGN PATENT DOCUMENTS

CN 1493021 A 4/2004

OTHER PUBLICATIONS

International Search Report and Written Opinion date mailed Aug. 16, 2012; PCT International Patent Application No. PCT/US2012/041854.

* cited by examiner

*Primary Examiner* — Matthew W Jellett
(74) *Attorney, Agent, or Firm* — McGuire Woods, LLP

(57) ABSTRACT

The disclosed embodiments include a pressure balance valve that solves one or more problems associated with existing designs. For example, in one embodiment, a pressure balancing valve assembly is disclosed that provides a low cost frictionless assembly that is constructed to not seal the leak path between an inlet port and an outlet port. Instead, this leak path is minimized with small angle tapered plunger and a precision bored annulus to provide a defined area for the pressure drop to occur and to limit the flow from the inlet to the outlet.

16 Claims, 4 Drawing Sheets

PRESSURE BALANCED VALVE

CROSS-REFERENCE TO RELATED APPLICATIONS

This application claims priority to U.S. Provisional Patent Application Ser. No. 61/496,916 filed on Jun. 14, 2011, the entire teachings of which are incorporated herein.

BACKGROUND OF THE INVENTION

1. Field of the Invention

The present invention relates generally to methods and systems for controlling fluid flow, and more particularly to a pressure balanced valve.

2. Discussion of the Related Art

Many industrial processes require precise control of various process fluids. For example, in the semiconductor industries, mass flow controllers are used to precisely measure and control the amount of a process fluid that is introduced to a process chamber. The term fluid is used herein to describe any type of matter in any state that is capable of flow. It is to be understood that the term fluid applies to liquids, gases, and slurries comprising any combination of matter or substance to which controlled flow may be of interest.

An integral part of mass flow controllers is the valve, which regulates, directs or controls the flow of a fluid by opening, closing, or partially obstructing various passageways. One such valve is a direct acting solenoid valve, which provides excellent resolution, is low cost, low power, fast acting, and small in size. While solenoid valves work great for low flows, they typically have problems when applied to control flows greater than about 100 Standard Liters per Minute (slpm). This problem occurs when the pressure forces across the metering orifice becomes a significant fraction of the solenoid pulling force and effects valve performance.

To combat the above problem, the disclosed embodiments include a pressure balanced valve that eliminates or reduces the pressure drop force to achieve reasonable valve performance for larger orifice diameters.

SUMMARY

The disclosed embodiments include a pressure balancing valve assembly that includes a body having a passageway connecting a first port and a second port. The pressure balancing valve assembly has a plunger located within an annular orifice. The plunger is configured to move a valve seat to close and open the passageway between the first port and the second port. A pressure balancing passageway is located within the plunger and is configured to transfer a first pressure from the first port to a plunger stem cavity. The pressure balancing valve assembly includes an annulus located between the plunger and the annular orifice. The annulus provides a pressure drop passageway between the plunger stem cavity and a second cavity having a second pressure associated with second port.

The disclosed embodiments also include a mass flow controller. The mass flow controller includes a flow path connected to a first port of the pressure balancing valve assembly as described above. The mass flow controller also includes a flow sensor assembly for sensing flow through the flow path; and a control device programmed to receive a desired flow rate, receive an indication of flow from the flow sensor assembly, determine an actual flow rate through the flow path, and control the valve assembly to regulate fluid flow.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION

The disclosed embodiments include an apparatus and method for creating a pressure balance valve that eliminates the problems associated with existing designs. The disclosed embodiments may be utilized with a mass flow controller, such as, but not limited to, the mass flow controllers disclosed in U.S. Patent Publication 20110191038 and U.S. Pat. No. 6,343,617, the teachings of which are hereby fully incorporated herein.

The disclosed embodiments and advantages thereof are best understood by referring to FIGS. 1-4 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and are not intended to assert or imply any limitation with regard to the environment, architecture, design, or process in which different embodiments may be implemented.

Figure 1:
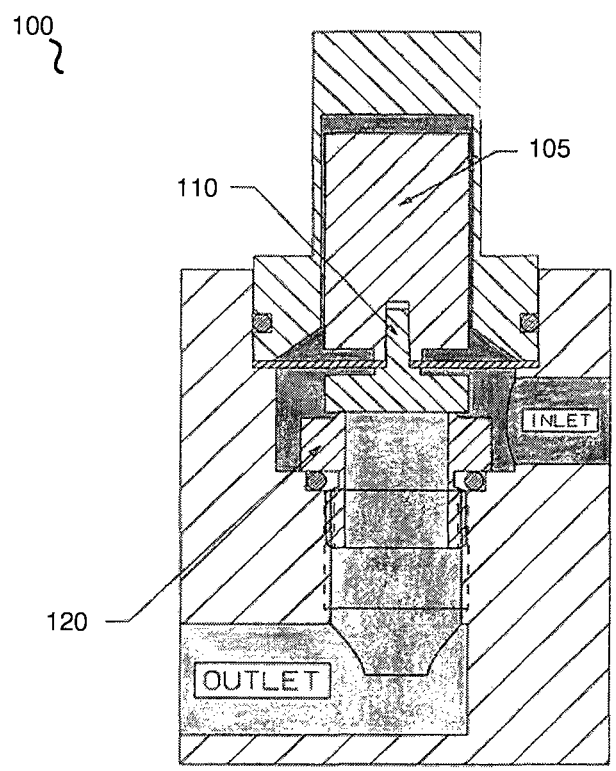
FIG. 1 illustrates the metering portion of a traditional direct acting solenoid valve.
Figure 2:
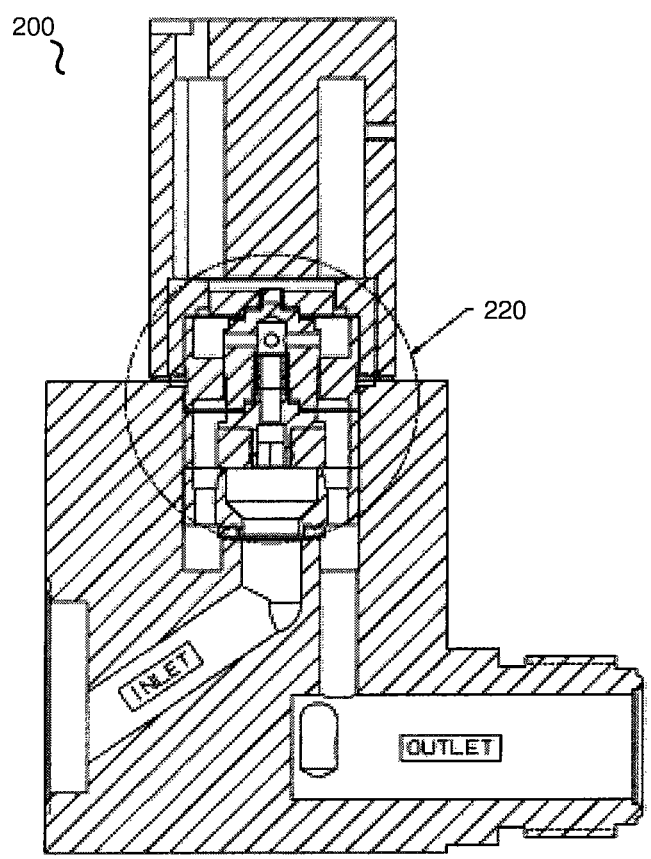
FIG. 2 illustrates a section view of a pressure balance valve in accordance with one embodiment.

FIG. 1 illustrates the metering portion of a traditional direct acting solenoid valve 100. Typically, the fluid flow is directed through the orifice hole radially between a seat 110 and an orifice land 120 as shown in FIG. 1. When the valve 100 is closed (zero current), a plunger 105 causes the seat 110 to contact the orifice land 120 to seal the flow path. The inlet pressure ($P_{inlet}$) creates a downward force acting to close the valve 100 and the outlet pressure ($P_{outlet}$) creates an opposing upward force. The difference between these two forces is referred to as the pressure drop force ($F_{dp}$) and is a downward force opposing the upward pull of the solenoid. This downward force can be calculated with the following equation: $F_{dp} = (P_{inlet} - P_{outlet}) * \text{the area of the orifice} (A_{orifice})$. The downward acting pressure drop force opposes the magnetic solenoid upward force and must be overcome to open the valve 100.

Table 1 indicates the magnitude of the pressure drop forces at various pressure drops and orifice diameters.

TABLE 1

Pressure Drop Forces
Pressure Drop Force (lbs.), $F_{dp}$

| Pressure Drop | Orifice Diameter (in) | | |
|---|---|---|---|
| (psi) | .062 | .125 | .250 |
| 10 | .03 | .12 | .49 |
| 30 | .09 | .37 | 1.47 |
| 50 | .15 | .61 | 2.45 |

For orifice diameters smaller than 0.062", pressure drop force has little effect on valve 100 performance as shown in Table 1. The pressure drop force becomes significant for orifice diameters greater than 0.125 inch and will cause higher valve operating currents. Flow rates above 100 slpm nitrogen; generally require orifice diameters greater than 0.125 inch and the pressure drop force becomes a significant factor in degrading valve 100 performance.

Therefore, the pressure drop force must be eliminated or reduced to achieve reasonable valve performance for larger orifice diameters as low current solenoids (less than 150 ma) do not provide the necessary pulling forces to overcome the pressure imbalance force.

One current way of eliminating or reducing the pressure drop force is by bleeding pressure through the valve head and into a plunger/stem cavity. This creates a flow path around the orifice for balancing the pressure drop force. However, existing pressure balanced valve designs that employ this method are constructed to seal the inlet port from the outlet port with either a sliding O-ring or moveable metal bellows. The O-ring sealed design balances the pressure drop force; however, the radially sealed O-ring imparts a significant amount of friction on the moving solenoid armature. This friction is unacceptable for a modulating solenoid valve. While the metal bellows approach does not produce the friction caused by the sliding O-ring, this approach is more costly due to added materials and labor cost.

Accordingly, the disclosed embodiments seek to provide a new apparatus and method for creating a pressure balance valve that eliminates the problems associated with existing designs. For example, with reference to FIG. 2, a section view of a pressure balance valve 200 in accordance with one embodiment is depicted. In this embodiment, the pressure balance valve 200 is configured to not seal the leak path between the inlet port and the outlet port as implemented in current designs (i.e., no sliding O-ring or metal bellows), thus, creating a low cost frictionless assembly. Instead, as will be further described, in one embodiment, the pressure balance valve 200 implements a small angle (e.g., less than 3 degrees) tapered plunger for creating a defined area for the pressure drop to occur and to limit the flow from the inlet to the outlet.

Figure 3:
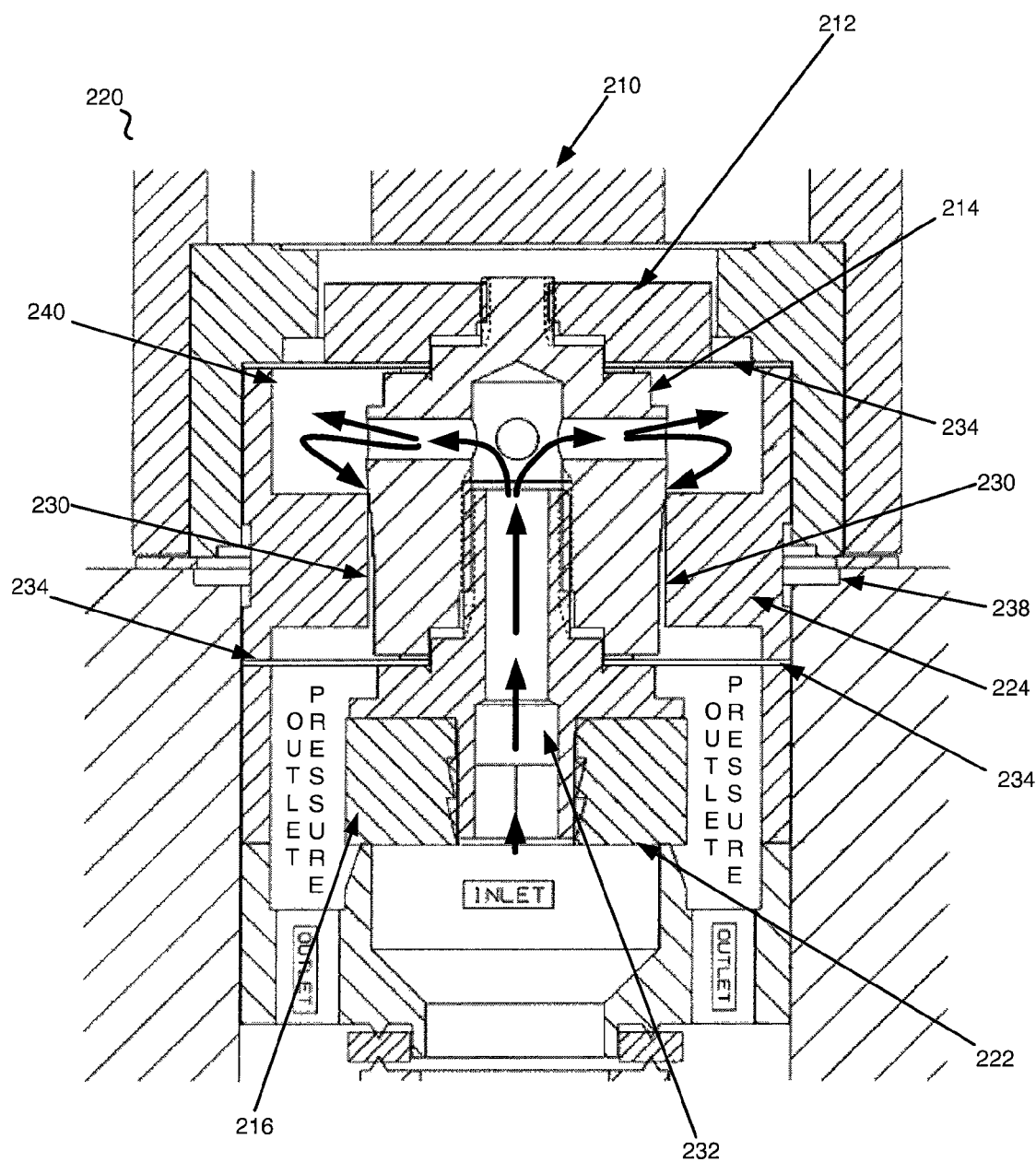
FIG. 3 provides an exploded section view of a portion of the pressure balance valve depicted in FIG. 2.

To provide a clearer illustration, FIG. 3 provides an exploded view of a section 220 of the pressure balance valve 200. As illustrated in the FIGS. 2 and 3, the pressure balance valve 200 is in a fully closed position, wherein the flow between the inlet and the outlet is restricted. The pressure balance valve 200 includes a solenoid coil housing 210 and a solenoid plunger 212. The solenoid coil housing 210 houses a solenoid coil that converts electrical energy into mechanical energy that causes the solenoid plunger 212 to move in response to the current on the solenoid coil. The solenoid plunger 212 is attached to a tapered annular plunger 214 via a thread. The tapered annular plunger 214 is raised or lowered in accordance with the movement of the solenoid plunger 212. On opposite ends of the solenoid plunger 212, the tapered annular plunger 214 is attached to a valve head 216, which is at least the size of a main orifice 222. Fluid flow between the inlet and the outlet is regulated by raising or lowering the valve head 216 from the main orifice 222.

In this particular embodiment, the inlet and the outlet of the pressure balance valve 200 are in reversed positions than the inlet and outlet positions depicted in the traditional direct acting solenoid valve 100 of FIG. 1, thus, reversing the inlet and outlet pressures. Accordingly, in this embodiment, the inlet pressure creates an upward force acting to open the valve. This force, however, can be up or down depending on the ratio of the area of the main orifice 222 to annular orifice 224.

In accordance with the disclosed embodiments, the pressure drop force can be minimized or eliminated by bleeding the inlet pressure through the valve head 216 and into the plunger/stem cavity 240, as depicted in FIG. 3 by the flow arrows. The leak path between the inlet and outlet is not sealed, but controlled with a thin annulus 230 created between the tapered annular plunger 214 and the annular orifice 224. The function of the annulus 230 is to provide a defined area for the pressure drop to occur and to limit the flow from the inlet to the outlet when the valve 200 is in a closed position. To achieve pressure balancing, the diameter of the tapered annular plunger 214 is sized to be equivalent to the diameter of the main orifice 222. When the valve is in the fully closed position, the annulus 230 created between the tapered annular plunger 214 and the annular orifice 224 is minimized to limit the leakage flow to a value less than the device leak through specification. In some embodiments, the size of the annulus 230 between the tapered annular plunger 214 and the annular orifice 224 is on the order of 0.0001".

In the depicted embodiment, the tapered angled is created by the angle of the tapered annular plunger 214. Alternatively, in other embodiments, a non-tapered annular plunger may be utilized and the tapered angle is created by tapering the annulus itself. Still, in other embodiments, the annular plunger and annulus may be non-tapered, but sufficiently sized to provide a defined area for the pressure drop to occur.

In one embodiment, a porting area 232 through the valve head 216 is sized significantly larger than the area of the annulus 230 so that the pressure that is bled through the valve head 216 remains equivalent to the inlet pressure.

Additionally, in certain embodiments, the tapered annular plunger 214 is centered within the annular orifice 224 and secured on both ends with flexible flat guide springs 234. These springs provide the opposing force to the solenoid pulling force and prevent the tapered annular plunger 214 from contacting the annular orifice 224.

The valve 200 may be constructed with a metal or elastomeric external seal 238. The valve head 216 may be made from tetrafluoroethylene (TFE), polytetrafluoroethylene (PTF), elastomer, plastic, metal, or other suitable material. The size/diameter of the main orifice 222 may be altered to achieve optimal performance over the flow, pressure and gas specifications of the product. However, in a preferred embodiment, the main orifice 222 and the tapered annular plunger 214 have equivalent areas to maintain optimal pressure balancing.

Figure 4:
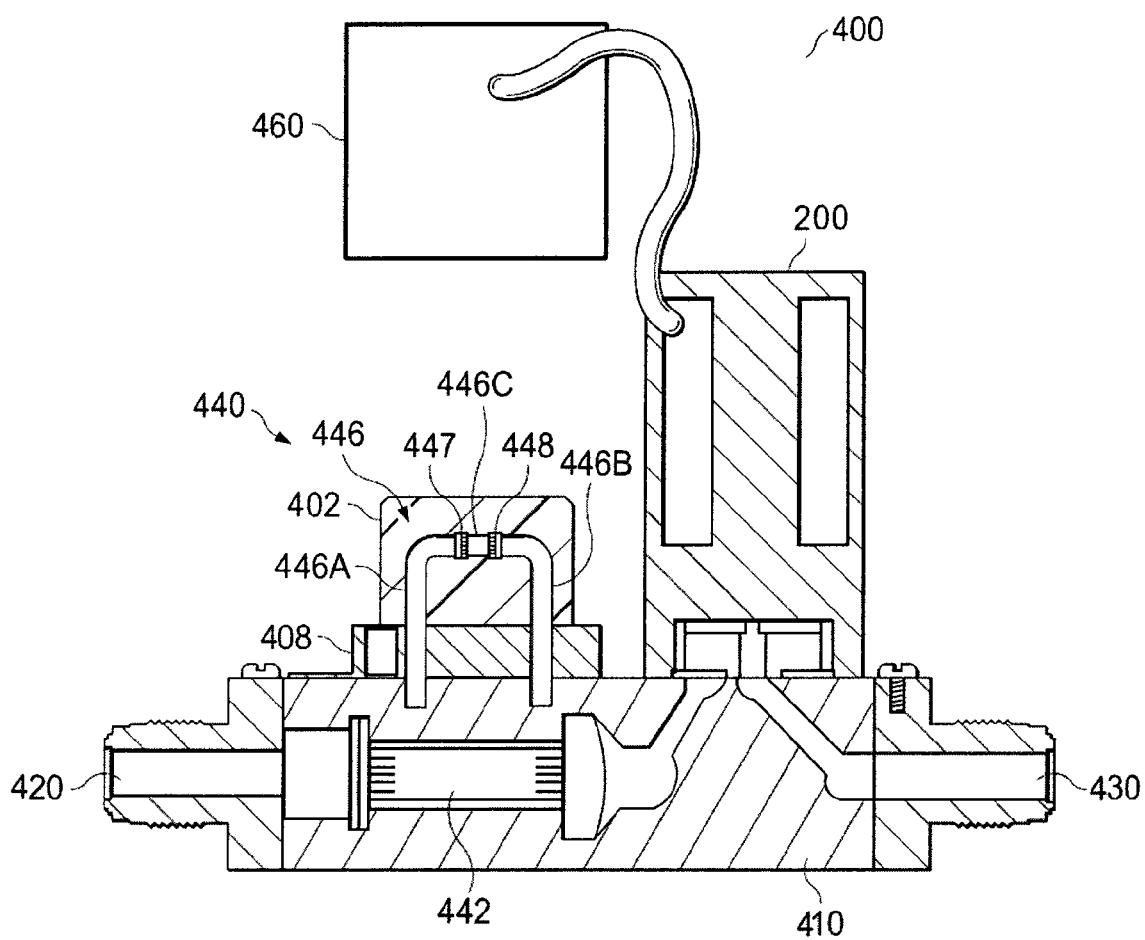
FIG. 4 illustrates an example of a mass flow controller in which a pressure balance valve in accordance with the disclosed embodiments may be incorporated within.

FIG. 4 illustrates an example of a mass flow controller (MFC) 400 in which the pressure balance valve 200 may be incorporated within. The mass flow controller 400 includes a block 410, which is the platform on which the components of the MFC are mounted. Components of the mass flow controller 400 includes an inlet port 420, an outlet port 430, a flow sensor/meter and a control valve, such as, but not limited to, the pressure balance valve 200, utilized for controlling the flow of fluid.

In the depicted embodiment, the mass flow controller 400 utilizes a thermal mass flow meter 440. The thermal mass flow meter 440 includes a bypass 442 through which typically a majority of fluid flows and a thermal flow sensor 446 through which a smaller portion of the fluid flows. Thermal flow sensor 446 is contained within a sensor housing 402 (portion shown removed to show sensor 446) mounted on a mounting plate or base 408. Sensor 446 is a small diameter tube, typically referred to as a capillary tube, with a sensor inlet portion 446A, a sensor outlet portion 446B, and a sensor measuring portion 446C about which two resistive coils or windings 447 and 448 are disposed. In operation, electrical current is provided to the two resistive windings 447 and 448, which are in thermal contact with the sensor measuring portion 446C. The current in the resistive windings 447 and 448 heats the fluid flowing in measuring portion 446 to a temperature above that of the fluid flowing through the bypass 442. The resistance of windings 447 and 448 varies with temperature. As fluid flows through the sensor conduit, heat is carried from the upstream resistor 447 toward the downstream resistor 448, with the temperature difference being proportional to the mass flow rate through the sensor.

An electrical signal related to the fluid flow through the sensor is derived from the two resistive windings 447 and 448. The electrical signal may be derived in a number of different ways, such as from the difference in the resistance of the resistive windings or from a difference in the amount of energy provided to each resistive winding to maintain each winding at a particular temperature. Examples of various ways in which an electrical signal correlating to the flow rate of a fluid in a thermal mass flow meter may be determined are described, for example, in commonly owned U.S. Pat. No. 6,845,659, which is hereby incorporated by reference. The electrical signals derived from the resistive windings 447 and 448 after signal processing comprise a sensor output signal.

The sensor output signal is correlated to mass flow in the mass flow meter so that the fluid flow can be determined when the electrical signal is measured. The sensor output signal is typically first correlated to the flow in sensor 446, which is then correlated to the mass flow in the bypass 442, so that the total flow through the flow meter can be determined and the pressure balance valve 200 can be controlled accordingly. The correlation between the sensor output signal and the fluid flow is complex and depends on a number of operating conditions including fluid species, flow rate, inlet and/or outlet pressure, temperature, etc.

The process of correlating raw sensor output to fluid flow entails tuning and/or calibrating the mass flow controller and is an expensive, labor intensive procedure, often requiring one or more skilled operators and specialized equipment. For example, the mass flow sensor may be tuned by running known amounts of a known fluid through the sensor portion and adjusting certain signal processing parameters to provide a response that accurately represents fluid flow. For example, the output may be normalized, so that a specified voltage range, such as 0 V to 5 V of the sensor output, corresponds to a flow rate range from zero to the top of the range for the sensor. The output may also be linearized, so that a change in the sensor output corresponds linearly to a change in flow rate. For example, doubling of the fluid output will cause a doubling of the electrical output if the output is linearized. The dynamic response of the sensor is determined, that is, inaccurate effects of change in pressure or flow rate that occur when the flow or pressure changes are determined so that such effects can be compensated.

A bypass may then be mounted to the sensor, and the bypass is tuned with the known fluid to determine an appropriate relationship between fluid flowing in the mass flow sensor and the fluid flowing in the bypass at various known flow rates, so that the total flow through the flow meter can be determined from the sensor output signal. In some mass flow controllers, no bypass is used, and the entire flow passes through the sensor. The mass flow sensor portion and bypass may then be mated to the pressure balance valve 200 and control electronics portions and then tuned again, under known conditions. The responses of the control electronics and the pressure balance valve 200 are then characterized so that the overall response of the system to a change in set point or input pressure is known, and the response can be used to control the system to provide the desired response.

Control electronics 460 control the position of the pressure balance valve 200 in accordance with a set point indicating the desired mass flow rate, and an electrical flow signal from the mass flow sensor indicative of the actual mass flow rate of the fluid flowing in the sensor conduit. Traditional feedback control methods such as proportional control, integral control, proportional-integral (PI) control, derivative control, proportional-derivative (PD) control, integral-derivative (ID) control, and proportional-integral-derivative (PID) control are then used to control the flow of fluid in the mass flow controller. A control signal (e.g., a control valve drive signal) is generated based upon an error signal that is the difference between a set point signal indicative of the desired mass flow rate of the fluid and a feedback signal that is related to the actual mass flow rate sensed by the mass flow sensor. The pressure balance valve 200 is positioned in the main fluid flow path (typically downstream of the bypass and mass flow sensor) and can be controlled (e.g., opened or closed) to vary the mass flow rate of fluid flowing through the main fluid flow path, the control being provided by the mass flow controller.

Accordingly, the disclosed embodiments provide a pressure balance valve that eliminates the problems associated with existing designs. The disclosed pressure balanced valve may be incorporated within a mass flow controller for controlling the flow of fluid. Advantages of the disclosed embodiments include, but are not limited to, balancing pressure drop forces without friction, lower cost assembly compared to welded metal bellows design, operates with low power solenoid, requires only one external seal, smaller in size compared to other high flow solenoid valves, and fast response due to direct acting solenoid. In addition, the disclosed embodiment for pressure balancing enables the use of larger orifice diameters which decreases axial stroke. This permits the use of higher spring constants which improves the valve control range.

Those skilled in the art will recognize that the present teachings are amenable to a variety of modifications and/or enhancements. While the foregoing has described what is considered to be the best mode and/or other examples, it is understood that various modifications may be made therein and that the subject matter disclosed herein may be implemented in various forms and examples, and that the teachings may be applied in numerous applications, only some of which have been described herein. For example, in the above description, the tapered plunger could alternatively be a straight cylinder with no taper or some type of labyrinth, the solenoid portion of the valve could be of different construction or utilize another actuation method such as a motor which would benefit from balancing the pressure drop force, and inlet and outlet flow path could be reversed. Such modifications are intended to be covered within the true scope of the present teachings.

What is claimed:

1. A valve assembly comprising:
a body having a passageway connecting a first port and a second port;
a tapered annular plunger located within an annular orifice, the plunger configured to move a valve head to close and open the passageway between the first port and the second port;
a pressure balancing passageway within the plunger configured to transfer a first pressure from the first port to a plunger stem cavity; and
a thin annulus located between the plunger and a side wall of the annular orifice, the thin annulus providing a pressure drop passageway between the plunger stem cavity and a second cavity having a second pressure associated with the second port when the valve is in a fully closed stationary position, the thin annulus having a tapered angle created by an angle of the tapered annular plunger and a ninety degree angle of the side wall of the annular orifice when the valve is in the fully closed stationary position, and wherein a leak path from the first port through the pressure balancing passageway to the second port is not sealed to reduce an amount of friction on the plunger as it moves.

2. The valve assembly according to claim 1, wherein the first port is an inlet port and the second port is an outlet port.

3. The valve assembly according to claim 1, wherein the first port is an outlet port and the second port is an inlet port.

4. The valve assembly according to claim 1, further comprising a porting area through the valve head, wherein the porting area is sized so as the first pressure that is transferred through the pressure balancing passageway remains equivalent to a pressure of the first port.

5. The valve assembly according to claim 1, wherein the thin annulus created between the tapered annular plunger and the annular orifice is minimized to limit a leakage flow to a rate less than a valve leakage rate of the valve in an off state for a device utilizing the valve assembly.

6. The valve assembly according to claim 1, wherein the thin annulus created between the tapered annular plunger and the annular orifice is less than 3 degrees.

7. The valve assembly according to claim 1, wherein the tapered annular plunger is centered within the annular orifice and secured on both ends with flexible flat guide springs.

8. The valve assembly according to claim 1, wherein the tapered annular plunger has an equivalent area to a main orifice.

9. The valve assembly according to claim 1, wherein the tapered annular plunger is actuated by a solenoid.

10. The valve assembly according to claim 1, wherein the tapered annular plunger is actuated by a motor.

11. The valve assembly according to claim 1, wherein the valve assembly is configured to be controlled by a control device that is programmed to receive a desired flow rate to regulate a fluid flow through a mass flow controller.

12. The valve assembly according to claim 1, wherein the pressure balancing passageway comprises dual exit ports to the plunger stem cavity, and wherein the first pressure from the first port is distributed to the plunger stem cavity via the dual exit ports.

13. A valve assembly comprising:
a body having a passageway connecting a first port and a second port;
a plunger located within an annular orifice, the plunger configured to move a valve head to close and open the passageway between the first port and the second port;
a pressure balancing passageway within the plunger configured to transfer a first pressure from the first port to a plunger stem cavity; and
a thin annulus located between the plunger and a tapered side wall of the annular orifice, the thin annulus providing a pressure drop passageway between the plunger stem cavity and a second cavity having a second pressure associated with the second port when the valve is in a fully closed stationary position, the thin annulus having a tapered angle created by an angle of the tapered side wall of the annular orifice and a ninety degree angle of an outer wall of the plunger when the valve is in the fully closed stationary position, and wherein a leak path from the first port through the pressure balancing passageway to the second port is not sealed to reduce an amount of friction on the plunger as it moves.

14. The valve assembly according to claim 13, wherein the tapered angle of the thin annulus created between the tapered side wall of the annular orifice and the outer wall of the plunger is less than 3 degrees when the valve is in the fully closed stationary position.

15. The valve assembly according to claim 13, wherein the plunger is centered within the annular orifice and secured on both ends with flexible flat guide springs.

16. The valve assembly according to claim 13, wherein the plunger has an equivalent area to a main orifice.

* * * * *